US009003367B2

(12) United States Patent
Park et al.

(10) Patent No.: US 9,003,367 B2
(45) Date of Patent: Apr. 7, 2015

(54) SPECIFIC DEBUG TRACE COLLECTING

(75) Inventors: Yoonho Park, Hawthorne, NY (US); Philippe L. Selo, Hawthorne, NY (US)

(73) Assignee: International Business Machines Corporation, Armonk, NY (US)

( * ) Notice: Subject to any disclaimer, the term of this patent is extended or adjusted under 35 U.S.C. 154(b) by 1632 days.

(21) Appl. No.: 12/463,609

(22) Filed: May 11, 2009

(65) Prior Publication Data

US 2010/0287539 A1 Nov. 11, 2010

(51) Int. Cl.
*G06F 9/44* (2006.01)
*G06F 11/36* (2006.01)

(52) U.S. Cl.
CPC ........ *G06F 11/3636* (2013.01); *G06F 11/3624* (2013.01)

(58) Field of Classification Search
None
See application file for complete search history.

(56) References Cited

U.S. PATENT DOCUMENTS

| 4,910,663 | A | | 3/1990 | Bailey |
| 6,161,216 | A | * | 12/2000 | Shagam ........................ 717/128 |
| 7,765,525 | B1 | * | 7/2010 | Davidson et al. ............. 717/124 |
| 2005/0015751 | A1 | * | 1/2005 | Grassens ....................... 717/130 |
| 2005/0034109 | A1 | | 2/2005 | Hamilton et al. |
| 2007/0006154 | A1 | * | 1/2007 | Yang et al. .................... 717/124 |

* cited by examiner

*Primary Examiner* — Qamrun Nahar
(74) *Attorney, Agent, or Firm* — Cantor Colburn LLP; Preston Young

(57) ABSTRACT

A computing system for converting software code into an executable program include an expanding preprocessor that receives software code including debug statements and expands the debug statements into conditions that include a static variable and that must be met before a trace contained in the statement is executed, the expanding preprocessor creating an expanded code output. The system also includes a replacement preprocessor coupled to the expanding preprocessor and receiving the expanded code, the replacement preprocessor forming replaced code by replacing one or more occurrences of the static variables with a unique variable name and a compiler that compiles the replacement code to create an executable.

17 Claims, 4 Drawing Sheets

SPECIFIC DEBUG TRACE COLLECTING

REFERENCE TO GOVERNMENT FUNDING

This invention was made with Government support under Contract No. H98230-07-C-0383, awarded by the United States Department of Defense. The Government has certain rights in this invention.

BACKGROUND

The present invention relates to improving the performance of computer software programs, and more specifically, to analyzing the performance of a program that is executing in the field.

A common way for software developers to analyze the execution of a program they are developing or modifying is to run the program on a "debugger" tool that allows them to set breakpoints in the code and to create a trace of the execution of the code. Such tools are used in the software development lab to test and debug programs. An additional way to analyze the execution of the code is to insert statements within the code itself that take some action to allow the programmer to later determine how the code was executed, such as by writing a value to a memory or printing a value whenever that statement is executed. Such may be referred to as a "debug" statement, although they can be used to analyze performance issues that may not be bugs. An example of a debug statement may be a portion of code that causes a value to be printed every time the particular code segment (or function) to which the debug statement is attached is accessed during operation of the code. Traditionally, debug statements in a software program (often referred to herein as code) are assigned a level which indicates the importance of the statement and a component. A debug level for the program is assigned at compile or run-time, and the statements of that importance or higher are output when the program runs.

For example, suppose there are levels—TRACE, DEBUG, and ERROR. TRACE is the least important, and ERROR is the most important. If the debug level is set to ERROR, then only ERROR debug statements will be output. If the debug level is set to TRACE, then all debug statements will output. Even if they do not trigger an output, such debug statements have some impact on the execution speed for the program because the execution of the debug statements themselves costs cycles, and thus debug statements are used judiciously. By contrast, debugging in the lab using a debugging tool that creates its own external trace does not impose the performance cost into programs running in the field.

If the debug level is set at compile time, then changing the debug level involves recompilation which is inconvenient and in many situations impossible. For example, consider a running program that encounters a slowdown or other performance reduction and, thus, may need to be debugged. In some instances, the running program may be mission critical and cannot (or should not) be turned off If the program cannot be turned off, it cannot be recompiled and, thus, debugging can be difficult.

SUMMARY

According to one embodiment of the present invention, a computing system for converting source code into an executable program is provided. The system of this embodiment includes a central processing unit and a memory device. The system also includes an expanding preprocessor that executes on the central processing unit and receives source code including a plurality of debug statements, each of which comprise a trace action, wherein the expanding preprocessor expands the debug statements into conditional statements and trace action statements, the conditional action statements including a static variable and that must be met before the trace action statement is performed. The system also includes a replacement preprocessor that executes on the central processing unit and forms replaced code by replacing the static variables in the conditional action statements created by the expanding preprocessor with a unique variable name that uniquely identifies each of the plurality of debug statements in the source code. The system also include a compiler that compiles the replacement code to create an executable program, wherein the executable program includes the conditional action statements with unique variables for each of the plurality of debug statement in the source code.

Another embodiment of the present invention is directed to a method of enabling debugging statements in a computer implemented process without stopping the execution of the code on a computing device executing the process that includes: receiving at the execution engine an executable, the executable including a plurality of debug traces, each debug trace being protected from execution by a conditional associated with a unique variable; receiving at the debugger a request to enable a particular debug trace; identifying in the symbol table a location in the memory where the unique variable associated with the debug trace is stored; and changing the value of the unique variable in the memory from a first value to a second value.

Another embodiment of the present invention is directed to a computing system for debugging executable code without requiring recompilation of the executable code. The system includes one or more central processing units receiving executable code wherein conditional action statements with unique variables have replaced a plurality of debug statement in source code; a memory device coupled to the one or more central processing units storing the executable code; a compiler that compiles the replacement code to create an executable program; and a debugger coupled to the central processing unit that may change the value of the unique variable names and thereby enable or disable individual conditional action statements.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Embodiments of the present invention may be directed to systems and methods that allow for debugging of running code with minor performance effects. In one embodiment, individual debugging statements may be turned on and off in a running program without requiring recompilation of the program.

In one embodiment, a preprocessor assigns a unique variable to each debug statement contained in the code. The value of this variable in memory determines if the debug statement will be output. At run-time a debugger engine may change the value of the variable in memory to selectively enable or disable the debug statement. In one embodiment, the name of each variable is mapped back to the source in a way that makes selection straightforward (e.g., file name and line number).

Systems and methods according to embodiments of the present invention may allow for the debugging of programs without recompilation or interrupting the operation thereof. Such may be useful, for example, at customer sites that cannot be recompiled or in the case of critical or long running programs that cannot be interrupted.

In one embodiment, debug statements added by the programmers are macros. These macros are expanded by a preprocessor into "if-then" statements that guard the execution of the trace (debug) output. The expanded statements contain a variable that is accessible in a predictable location independent of execution. To that end, the variable discussed herein may be referred to as a well known variable. One example of such a variable is a "static variable" in C/C++. An example of an expanded statement may be as follows: In source code the statements DEBUG(ERROR, "ERROR: We have an error") may be expanded to if debug(debug_level>=ERROR) fprintf (stderr, "ERROR: We have an error\n").

In a subsequent preprocessor, the well-known variable name is replaced by a unique name, and the unique name may identify the file name and line number of the debug statement. Of course, any unique name may be used and is not confined to the examples given herein. The program is then compiled as usual.

To enable a debug statement, the value of the appropriate unique variable is modified by a debugging engine (typically by user invocation). The memory location of the unique variables can be obtained from the symbol table created during compilation. This enabling of debug statements may be performed by the program itself, an external program, or remotely via remote procedure call.

Figure 1:
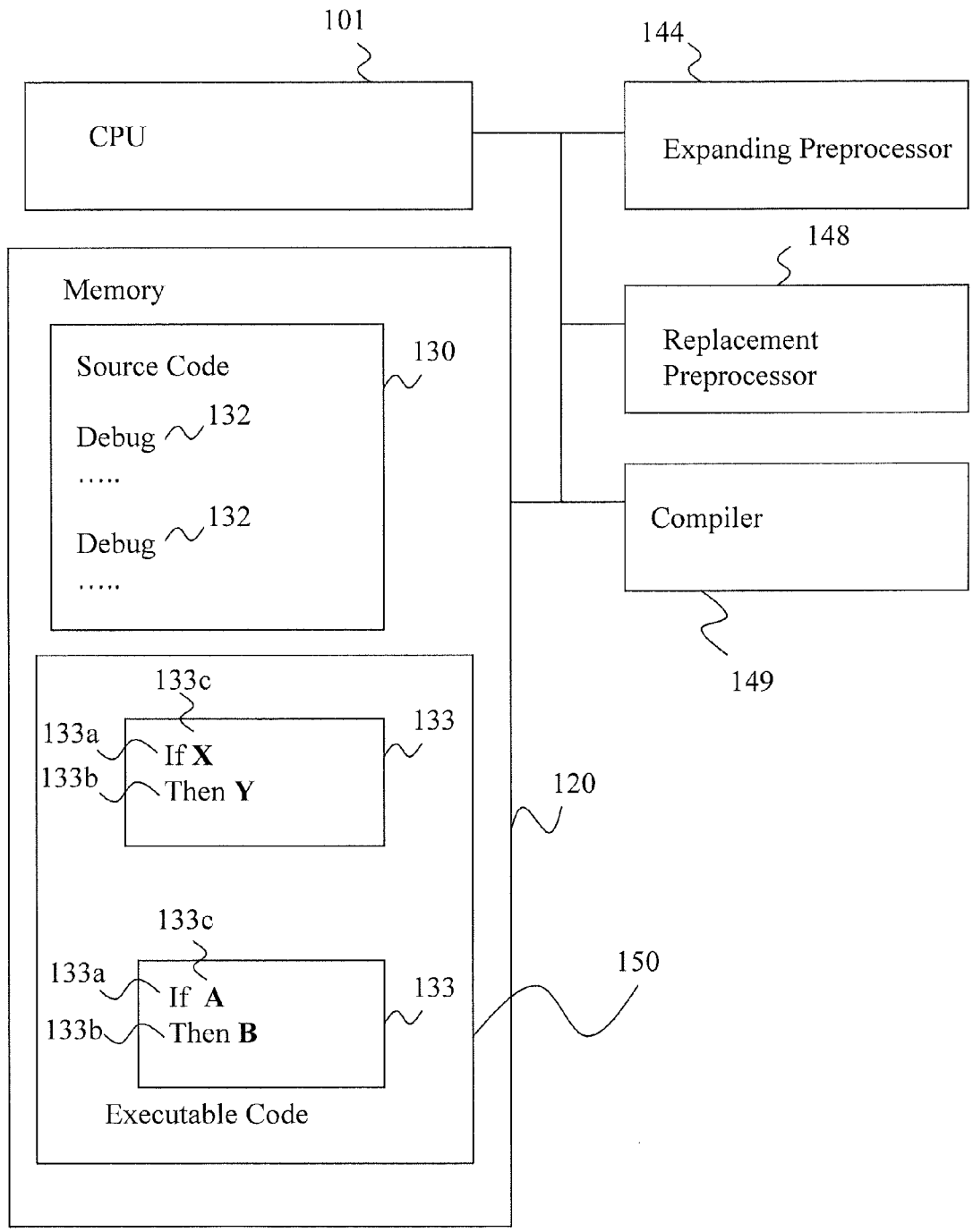
FIG. 1 shows portions of a system that may be utilized in the compilation and execution of a program that includes specific debug trace statements according to an embodiment of the present invention.
Figure 4:
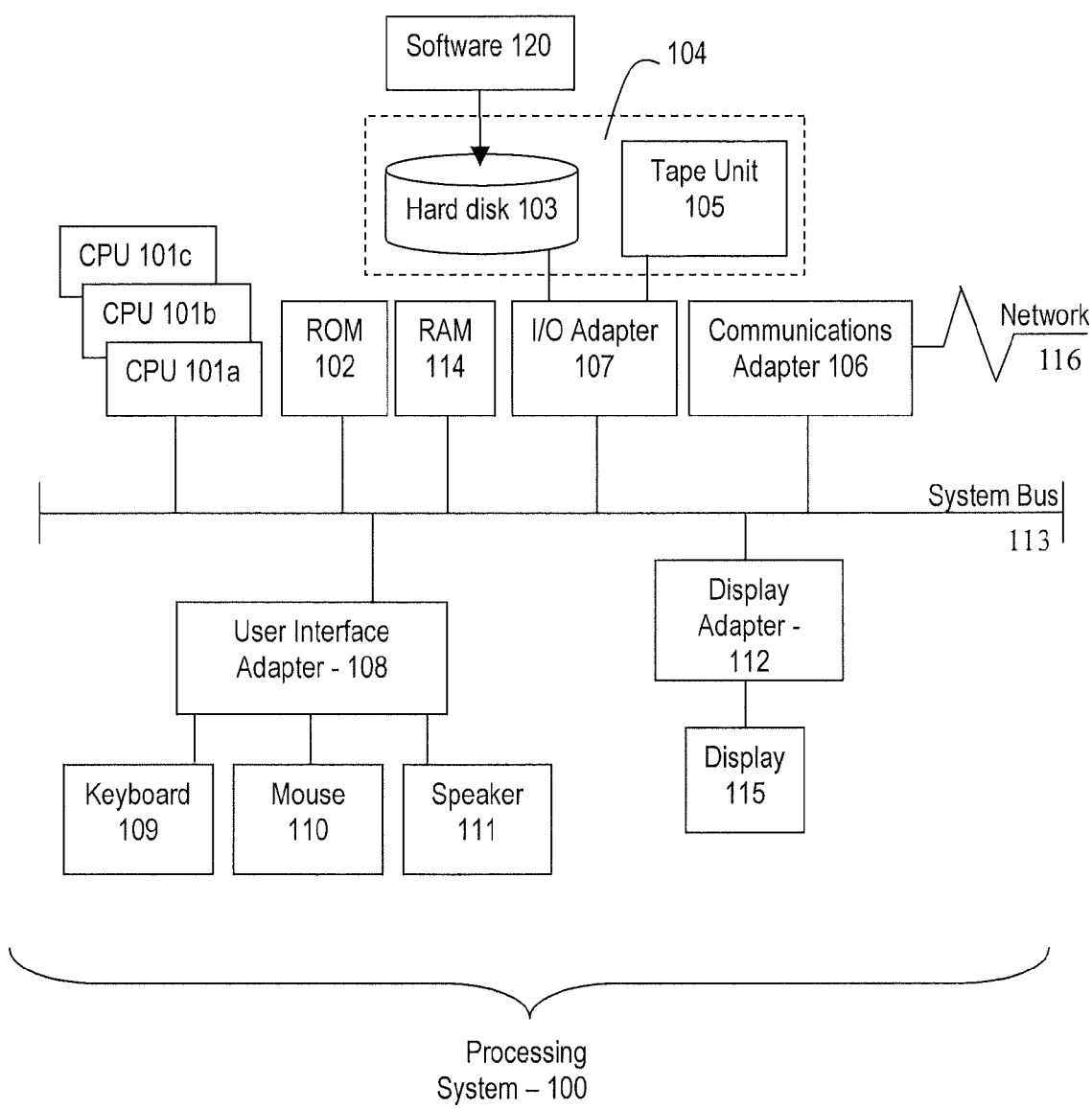
FIG. 4 shows a block diagram of a computer system and software that may be utilized according to an embodiment of the present invention.

FIG. 1 shows portions of a system that may be utilized in the compilation and execution of a program that includes specific debug trace statements according to an embodiment of the present invention. As shown in FIG. 1, a processing system 100 includes a central processing unit (CPU) 101 and a memory 120. Further details of a processing system 100 are shown in FIG. 4. As shown in FIG. 1, the memory 120 may contain source code 130. It shall be understood that memory 120 may be distributed among multiple computing devices in some embodiments. The system may also include an expanding preprocessor 144, a replacement processor 148, a compiler 149, and executable code 150. In embodiments, expanding preprocessor 144, replacement processor 148, and compiler 149 are executed by CPU 101. The executable code 150 may also be executed on CPU 101, but is typically executed on a processor of another system in the field. It shall also be understood that the expanding preprocessor 144 and the replacement preprocessor 148 may be at one location and the compiler 149 may be at another location.

Source code 130 is written in a so-called high-level computer language, such as C, C++, SPADE, JAVA and the like. The software code 130 is complied into executable code that is specific to a particular processor architecture, such as the POWER PC architecture from the International Business Machines Corp. As shown in FIG. 1, source code 130 contains debug statements 132. Each debug statement 132 may be a macro (for example) that contains a conditional action. For example, the debug statement upon execution may cause a value to be printed, a value to be written to a file, execution of the program to stop. As explained in more detail below, according to embodiments of the present invention, the expanding preprocessor 144 and replacement processor 248 may preprocess the debug statements 132 in the source code 130 to create, for each, a conditional statement and one or more trace action statements. Thus, because they are replaced, the debug statements do not need to be part of the standard instruction set of the language in which the source code is written.

As shown in FIG. 1, executable code 150 contains a plurality of debug statement replacements 133. Each debug replacement statement 133 corresponds to a debug statement 132 in source code 130 and contains a conditional action statement 133a and one or more trace action statements 133b. As shown, conditional action statement contains a unique identifier 133c that uniquely identifies the corresponding debug statements in the source code. Executable code 150 further contains a table 160 that has one entry for each of the unique identifiers 133c. Each entry can be set to a value, such as on or off, that enables or disables the conditional statement and turns the debug statement on or off.

Figure 2:
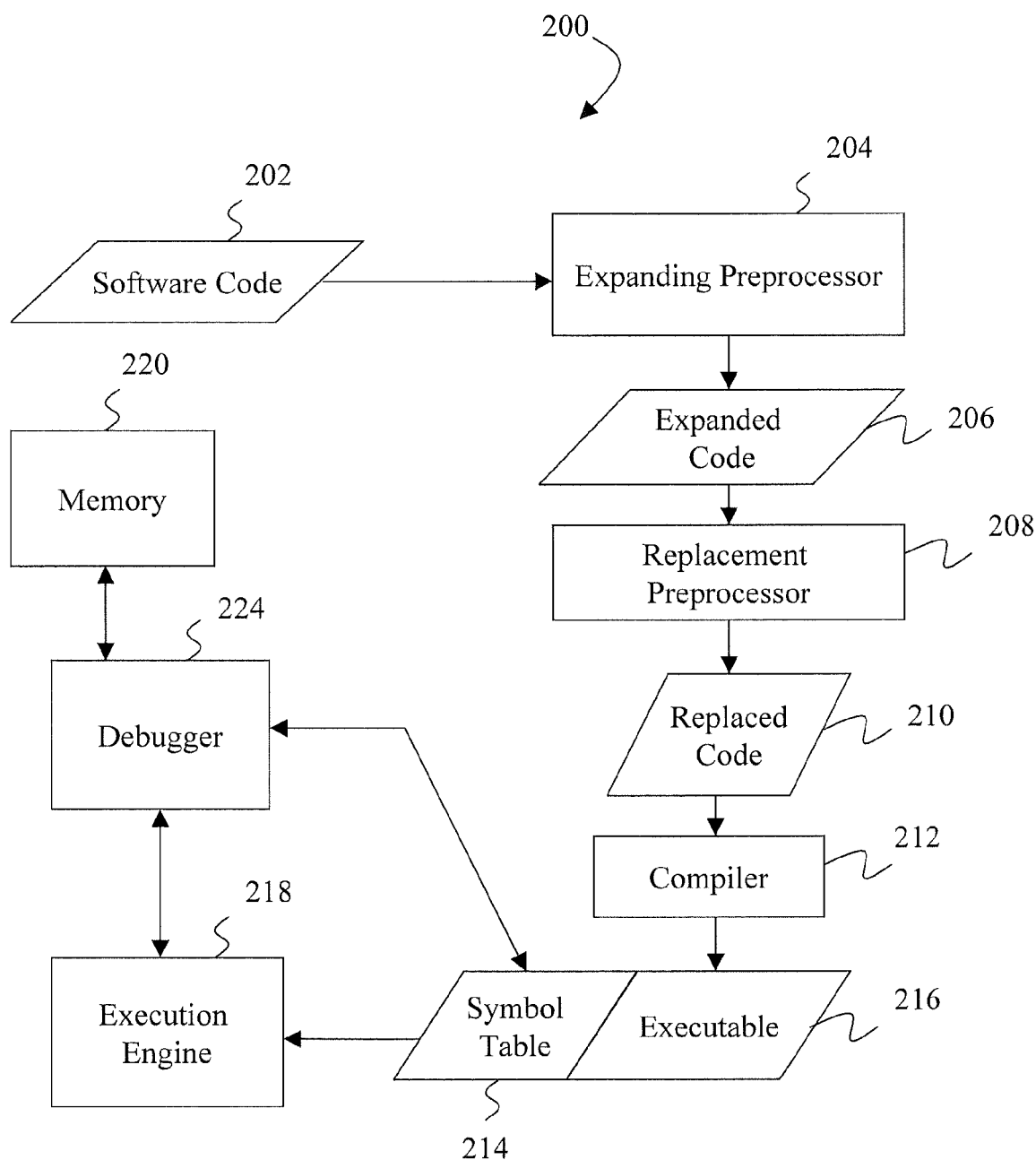
FIG. 2 shows a data flow diagram for that includes specific debug trace statements according to one embodiment of the present invention.

FIG. 2 shows a data flow diagram of the operation of a system 200 according to an embodiment of the present invention. Software code 202 in any language is the input to the system 200. The software code 202 (or "software" or "code") may be written in any language. Examples of languages for code 202 include, but are not limited to, C and C++. This code includes debug statements. Typically, these debug statements are in the form of macros that, based on a particular condition, cause a particular output (often referred to as a trace). As described above, each debug statement may be assigned a particular debug level. Embodiments of the present invention, however, do not require that a programmer vary how the debug statements are written and, as such, are transparent to the programmer. That is, the programmer may utilize prior art debug macros without regard for any further processing that may be taught herein.

In one embodiment, the system 200 may include an expanding preprocessor 204. In one embodiment, the expanding preprocessor expand the debug macros used in the code 202. Macros are commonly used in C to define small snippets of code. In the expanding preprocessor 204, each macro call is replaced, in-line, by the corresponding macro definition and includes an "if" statement that guards the statement (based on variable with a well-known name) from execution. The "if" statement contains, in the case of debug statements, a static variable with a well-known name. For example, the static variable may be the particular debug level name.

The result of expanding the software code 202 by the expanding preprocessor 204 is shown in FIG. 2 as expanded code 206. In embodiments of the present invention, the expanded code 206 is processed by a replacement preprocessor 208.

The replacement preprocessor 208, each well-known variable name is replaced with a unique name that identifies uniquely each use of the variable. For example, the well-known variable name may be replaced with the file name containing the variable (of interest are debug statements but could be applied to all statements) and the line number of the variable. That is, the replaced variable name may identify the file or function name and line number of the debug statement replaced. In one embodiment, each replaced variable name is a static variable. In one embodiment, the relationship between the replacement name and the original debug statement may be stored in a symbol table 214. In computer science, a symbol table is a data structure generated by a language translator such as a compiler or interpreter, where each identifier (variable) in a program's source code is associated with information relating to its declaration or appearance in the source, such as its type, scope level and its memory location. In one embodiment, the actual value in memory (not shown) assigned to the debug may be set so that the debug statement is enabled.

The replacement preprocessor 208 creates replacement code 210. This replacement code 210 contains the expanded code 206 with the well-known variable names replaced as described above. This replacement code 212 may then be compiled in the usual manner by the compiler 212 to create an executable program 216.

The executable program 216 is then run by an execution engine 218. As discussed above, the value of the replaced variables described above may be set so that their values do not allow for the debug statements to be active. In one embodiment, this may be achieved by setting the values to a static value which is represented in memory 220. Assuming that the system is operating correctly, the execution engine 218 may continue operating the program until it is complete or until such time as performance begins to degrade. In the case that performance degrades, it may be desirable to debug the code without stopping execution of the program. Assuming a basic (or intimate) knowledge of the software code, a programmer or other assigned to diagnose the problem may choose to enable particular debug statements either one at a time or in various combinations. To that end, the system 200 may also include a debugger 224. The debugger 224 may be any known or later developed debugger that is at least capable of changing variable values in memory 220. The debugger 224 accesses the symbol table 214 to obtain the location of the appropriate static variable (e.g., replacement variable) in memory 220. The debugger 224 then enables or disables the variable based on user desires. A user may interface with the debugger 224 by known means. While the term "debugger" is used herein, the debugger 224 may not be required. Indeed, the functions of the debugger utilized in herein (turning on and off debug statements) may be performed by the program itself, an external program, or via remote procedure call (a variation of the program itself).

Figure 3:
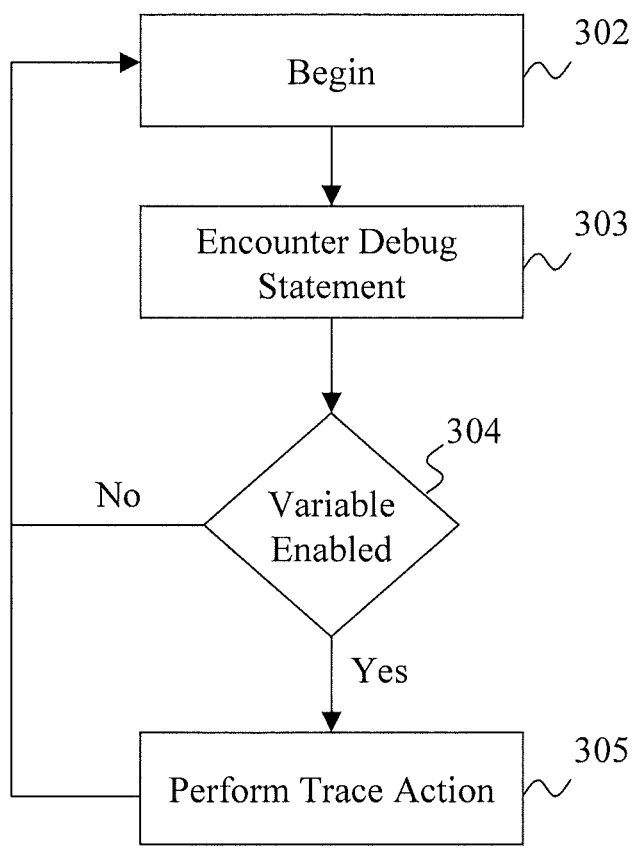
FIG. 3 shows a flow diagram of a method according to an embodiment of the present invention.

FIG. 3 shows a flow diagram of a method according to an embodiment of the present invention. The result of this method is an executable program that may be executable code with debug trace statements compiled using the method and system discussed above with reference to FIGS. 1 and 2. This program may be executing in the field, such as at a customer location. For example, this program may be a stream processing program, an employee resource planning program, etc.

As shown in FIG. 3, at step 301 a person who whishes to analyze the execution of the program changes the values of some of the unique identifiers for the debug statements to enable one or more debug statements. At step 302, the program may begin executing. In other embodiments, the program may be currently executing when the values of the unique identifiers are changed. At step 303, a conditional statement that corresponds to a debug statement is encountered during the execution of the code. At step 304, a test is made of the value of the unique identifier variable for this debug statement to see if it is enabled. If it is enabled, then at 305 the corresponding trace actions are taken. For example, the trace action may be to write the unique identifier to a file. If the debug statement is not enabled, then the program contains to execute without performing the corresponding trace actions until another conditional debug statement is encountered (303). The software developer may then examine the results of this trace execution and, if desired, may enable other debug statements in the program.

Referring to FIG. 4, there is shown an embodiment of a processing system 100 for implementing the teachings herein. In this embodiment, the system 100 has one or more central processing units (processors) 101a, 101b, 101c, etc. (collectively or generically referred to as processor(s) 101). In one embodiment, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of system 100.

FIG. 4 further depicts an input/output (I/O) adapter 107 and a communications adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. A network adapter 106 interconnects bus 113 with an outside network 116 enabling data processing system 100 to communicate with other such systems. A screen (e.g., a display monitor) 115 is connected to system bus 113 by display adaptor 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Components Interface (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

Thus, as configured in FIG. 4, the system 100 includes processing means in the form of processors 101, storage means including system memory 114 and mass storage 104, input means such as keyboard 109 and mouse 110, and output means including speaker 111 and display 115. In one embodiment, a portion of system memory 114 and mass storage 104 collectively store an operating system such as the AIX® operating system from IBM Corporation to coordinate the functions of the various components shown in FIG. 1.

It will be appreciated that the system 100 can be any suitable computer or computing platform, and may include a terminal, wireless device, information appliance, device, workstation, mini-computer, mainframe computer, personal digital assistant (PDA) or other computing device. It shall be understood that the system 100 may include multiple computing devices linked together by a communication network. For example, there may exist a client-server relationship between two systems and processing may be split between the two.

Examples of operating systems that may be supported by the system 100 include Windows 95, Windows 98, Windows NT 4.0, Windows XP, Windows 2000, Windows CE, Windows Vista, Mac OS, AIX, LINUX, and UNIX, or any other suitable operating system. As discussed above, the system 100 also includes a communications adapter 106 for communicating over a network 116. The network 116 can be a local-area network (LAN), a metro-area network (MAN), or wide-area network (WAN), such as the Internet or World Wide Web.

Users of the system 100 can connect to the network through any suitable network interface 116 connection, such as standard telephone lines, digital subscriber line, LAN or WAN links (e.g., T1, T3), broadband connections (Frame Relay, ATM), and wireless connections (e.g., 802.11(a), 802.11(b), 802.11(g)).

As disclosed herein, the system 100 includes machine-readable instructions stored on machine readable media (for example, the hard disk 104) for capture and interactive display of information shown on the screen 115 of a user. As discussed herein, the instructions are referred to as "software" 120. The software 120 may include various tools and features for providing user interaction capabilities as are known in the art.

In some embodiments, the software 120 is provided as an overlay to another program. For example, the software 120 may be provided as an "add-in" to an application (or operating system). Note that the term "add-in" generally refers to supplemental program code as is known in the art. In such embodiments, the software 120 may replace structures or objects of the application or operating system with which it cooperates.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A computing system for converting source code into an executable program, the system comprising:
    a central processing unit;
    a memory device;
        an expanding preprocessor that executes on the central processing unit and receives source code including a plurality of debug statements, each of which comprise a trace action, wherein the expanding preprocessor expands the debug statements into conditional statements and trace action statements, the conditional action statements including a static variable and that must be met before the trace action statement is performed;
        a replacement preprocessor that executes on the central processing unit and forms replaced code by replacing the static variables in the conditional action statements created by the expanding preprocessor with a unique variable name that uniquely identifies each of the plurality of debug statements in the source code; and
        a compiler that compiles the replacement code to create an executable program, wherein the executable program includes the conditional action statements with unique variables for each of the plurality of debug statement in the source code.

2. The system of claim 1, further comprising:
    an execution engine that executes the executable; and
    a debugger coupled to the execution engine.

3. The system of claim 2, wherein the debugger, based on a user command, changes a value of the unique variable name in the memory causing a particular traces to be executed.

4. The system of claim 3, further comprising:
    a symbol table having one or more entries created by the replacement preprocessor; and
    wherein a location in the memory of the unique variable is stored in the symbol table and accessed by the debugger.

5. The system of claim 4, wherein the debugger changes the value and enables the trace without requiring that the execution engine stop executing the executable.

6. The system of claim 4, wherein the debugger changes the value and enables the trace without requiring that the software code be recompiled.

7. The system of claim 1, wherein the unique variable name encodes a function name and a line number.

8. The system of claim 1, wherein the conditions include an if condition.

9. A method of enabling debugging statements in a computer implemented process without stopping the execution of the code on a computing device executing the process, the computing device including and execution engine, a debugger, a memory and a symbol table, the method comprising:
    receiving at the execution engine an executable, the executable including a plurality of debug traces, each debug trace being protected from execution by a conditional associated with a unique variable that has replaced a static variable previously contained in the conditional;

receiving at the debugger a request to enable a particular debug trace;

identifying in the symbol table a location in the memory where the unique variable associated with the debug trace is stored; and changing the value of the unique variable in the memory from a first value to a second value.

10. The method of claim 9, wherein the request is received from a user.

11. The method of claim 9, wherein the unique variable includes a function name and line number.

12. A computing system for debugging executable code without requiring recompilation of the executable code, the system comprising:

one or more central processing units, the one or more central processing units receiving executable code wherein conditional action statements with unique variables have replaced a plurality of debug statement in source code, wherein the unique variable have replaced static variables previously contained in the conditional;

a memory device coupled to the one or more central processing units storing the executable code;

a compiler that compiles the replacement code to create an executable program; and a debugger coupled to the central processing unit that may change the value of the unique variable names and thereby enable or disable individual conditional action statements.

13. The system of claim 12, wherein the executable code includes:

a symbol table having one or more entries identifying created by the replacement preprocessor; and wherein a location in the memory of the unique variable is stored in the symbol table and accessed by the debugger.

14. The system of claim 13, wherein the debugger changes the value and enables the trace without requiring that an execution engine stop executing the executable.

15. The system of claim 14, wherein the debugger changes the value and enables the trace without requiring that the executable be recompiled.

16. The system of claim 12, wherein the unique variable name encodes a function name and a line number.

17. The system of claim 12, wherein the conditional action statements include an if condition.

* * * * *